United States Patent Office 2,891,233
Patented June 16, 1959

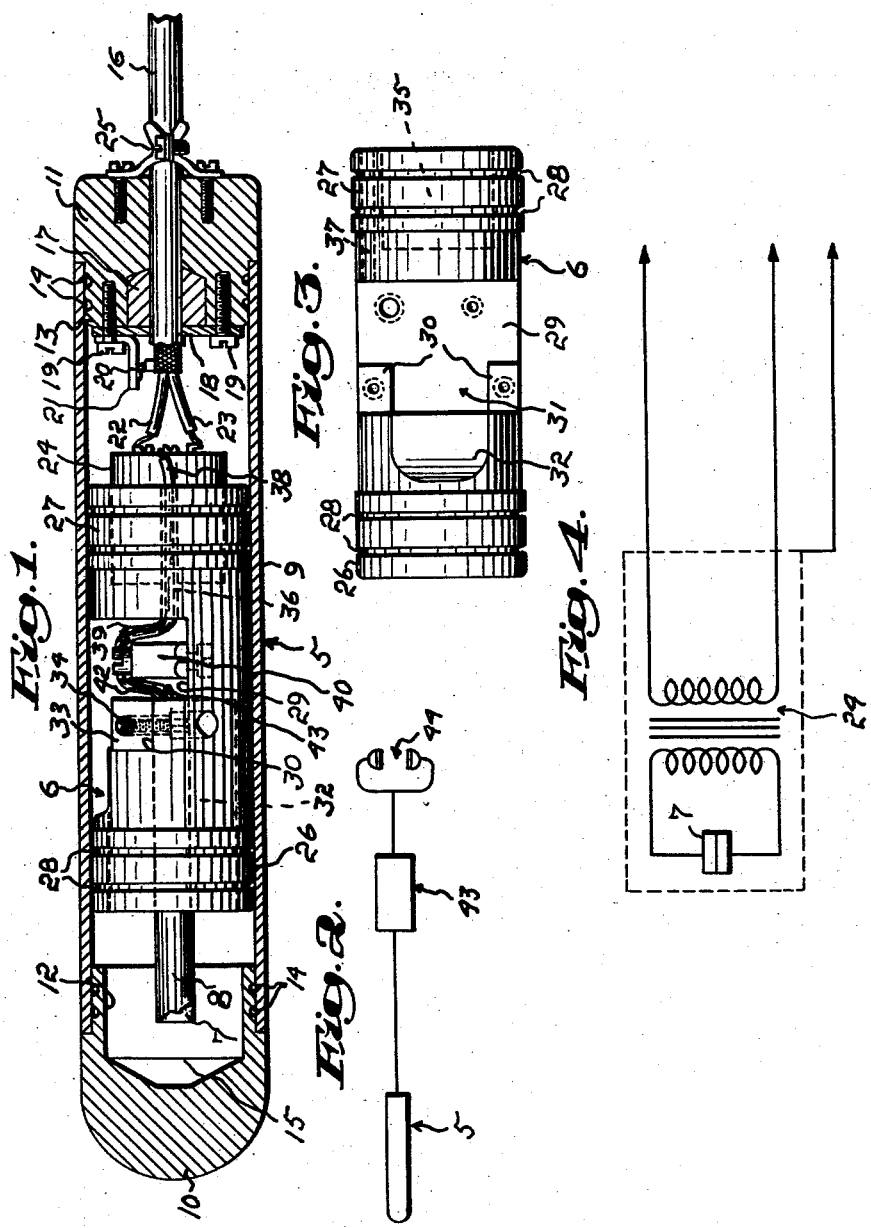

2,891,233

MICROSEISMIC DETECTION APPARATUS AND PARTICULARLY GEOPHONES THEREFOR

Francis J. Crandell, Wellesley, Mass.

Application December 22, 1954, Serial No. 476,903

2 Claims. (Cl. 340—17)

This invention relates to microseismic detection apparatus and particularly to geophones therefor.

When any geological structure is subjected to strains, readjustments in its crystalline make-up occur until it is again in static equilibrium and such readjustments are attended by minute vibrations and sub-audible sounds. The microseismic rate increases with strain and decreases as static equilibrium is approached and for any geological structure, the rate at which failure will occur can be readily ascertained. With means enabling the microseisms involved in the readjustment of the crystalline structure to be monitored, preferably by sound, and with knowledge of the failure rate of that structure, mine safety, in terms of its structure, may be accurately analyzed.

The principal objective of this invention is to provide apparatus enabling such analysis to be easily and accurately made. Apparatus in accordance with the invention comprises a geophone housing a piezo-electric crystal which is preferably supported therein as a cantilever beam in a mount also housing a transformer. An amplifier is also employed to suitably step up the minute piezo-electric voltages to convert the same into sound in the audible range.

With such apparatus, the activity of the geological structure of the mine may be analyzed with maximum ease, convenience, and accuracy to determine such factors as the safe and unsafe sections of a mine, the location and possible time of a failure, and active locations, with information as to whether the microseismic rate is increasing or decreasing.

In the accompanying drawings, there is shown an illustrative embodiment of the invention from which other of its objectives, novel features and advantages will be readily apparent.

In the drawings:

Fig. 1 is a longitudinal section through the geophone.

Fig. 2 is a diagrammatic view the apparatus.

Fig. 3 is an illustration of the crystal and transformer mount turned 90° from its Fig. 1 position, and Fig. 4 is a schematic view of the geophone wiring.

In the embodiment of the invention shown in the drawings, a hollow, elongated geophone body, generally indicated at 5, houses a holder, generally indicated at 6, for the piezo-electric crystal 7, preferably of a Rochelle salt type, and having a gold leaf shield, suggested at 8.

The body 5 is shown as formed by closing the ends of a sleeve 9 with front and rear caps 10 and 11, respectively, having sleeve entering portions 12 and 13 respectively and each annularly grooved as at 14 for the retention of a suitable and preferably waterproof compound applied thereto before the caps are seated in their respective sleeve ends.

The front cap 10 is chambered as at 15 to receive freely the free end of the crystal 7. The rear cap 11 is formed with an axial bore for the shielded two conductor cable 16 and has a chamber for the packing 17 adapted to be compressed to provide a tight seal between the cable 16 and the cap 11 when the compression plate 18 is tightened against said packing as by means of the screws 19. By this construction, and by the anchoring of the caps, the geophone interior is hermetically sealed.

Cables that are vinyl jacketed have proved satisfactory and the cable jacket is broken away to enable the shield 20 to be soldered to the lug 21 which is anchored in place by one of the screws 19. The cable wires 22 and 23 are secured to appropriate terminals of the transformer 24. All portions of the circuit between the transformer 24 and the compression plate 18 are, in practice, coated with a sealing compound. The cap 11 is also provided with a cord strain relief 25 at its exposed end.

The crystal holder 6 has front and rear portions 26 and 27 dimensioned to snugly fit the sleeve 9 and having annular grooves 28 to retain the sealing compound by which the holder 6 is secured in place in the sleeve 9. The portions 26 and 27 are spaced apart by a transverse channel 29 having a pair of shoulders 30 along its front edge spaced to define a seat 31 (see Fig. 3) extending into the chamber 32 which opens through the front end of the crystal holder 6. The crystal 7 is housed in the chamber 32 with its rear end clamped against the seat 31 by the bridge 33 locked against the shoulders 30 as at 34 and with its front portion extending forwardly of the holder 6 into the cap chamber 15.

The portion 27 has a rearwardly opening chamber 35 dimensioned to receive the transformer 24 as a force fit therein. Passages 36 and 37 through the portion 27 enable the leads 38 and 39 to be connected to the transformer 24 and to the stand-off insulator 40 located in the channel 29 to which also are connected the crystal leads 42 and 43 which are in practice gold leaf pigtails.

In Fig. 2, the cable 16 is shown as connecting the instrument to a suitable amplifier, generally indicated at 43, and shown as having earphones 44 connected thereto. The amplifier 43 is not detailed, but it will be appreciated that the amplifier must be adapted to suitably step up the piezo-electric voltage and convert it into sound in the audible range. At the same time, the bulk and weight of the equipment must be kept to a minimum for most effective and efficient use.

With microseismic apparatus in accordance with the invention, determination of a mine safety by analysis of microseisms may be quickly and accurately made. In practice, the geophone is inserted into a previously drilled hole, six feet deep, for example, at regular intervals to enable the microseismic rate to be determined and recorded with the date and time of the observation.

Assuming the microseismic rate to be known when failure will occur, the observations provide data enabling unsafe areas to be readily determined and areas of failure to be accurately predicted. While safety or danger is reflected by a decrease or an increase in the microseismic rate, it will also be appreciated that a comparison of the intensity of the signal enables danger points to be accurately located.

What I therefore claim and desire to secure by Letters Patent is:

1. In a geophone, a sleeve, front and rear end caps closing the ends of said sleeve, a holder in said sleeve spaced from said caps and including forward and rearward cylindrical portions dimensioned to fit said sleeve and an intermediate part having an approximately axial seat, said caps and said portions being secured to said sleeve, said forward portion having an axial chamber opening through its front end and also in communication with said seat, a piezo-electric crystal extending through said chamber with its rear end clamped to said seat, and a transformer carried by said rearward portion approximately axially thereof and operatively connected to the seated end of said crystal.

2. In a geophone, a sleeve, front and rear end caps closing the ends of said sleeve, a holder in said sleeve spaced from said caps and including forward and rearward cylindrical portions dimensioned to fit said sleeve and an intermediate part provided with a pair of transversely spaced shoulders and an intermediate seat and a transverse channel with which said seat is in communication, said caps and said portions being secured to said sleeve, said forward portion having an axial chamber opening through its front end and also in communication with said seat, a piezo-electric crystal extending through said chamber with its rear end clamped to said seat, said rearward portion having a rearwardly opening chamber also in communication with said channel, a transformer mounted in said rearwardly opening chamber, and a connection between said seated end of said crystal and said transformer, said connection including an insulator mounted in said channel.

References Cited in the file of this patent

UNITED STATES PATENTS

| | | |
|---|---|---|
| 1,919,480 | Rieber | July 25, 1933 |
| 2,133,333 | Proctor | Oct. 18, 1938 |
| 2,233,992 | Wyckoff | Mar. 4, 1941 |
| 2,384,465 | Harrison | Sept. 11, 1945 |
| 2,405,605 | Goodale | Aug. 13, 1946 |
| 2,558,012 | Star | June 26, 1951 |
| 2,613,261 | Masa | Oct. 7, 1952 |